US009755927B2

(12) United States Patent
Li et al.

(10) Patent No.: US 9,755,927 B2
(45) Date of Patent: Sep. 5, 2017

(54) INTERMEDIATE NODE DETERMINING METHOD AND APPARATUS

(71) Applicant: Huawei Technologies Co., Ltd., Shenzhen (CN)

(72) Inventors: Yingtao Li, Shenzhen (CN); Hao Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 41 days.

(21) Appl. No.: 14/635,680

(22) Filed: Mar. 2, 2015

(65) Prior Publication Data

US 2015/0256428 A1 Sep. 10, 2015

(30) Foreign Application Priority Data

Mar. 6, 2014 (CN) .......................... 2014 1 0083214

(51) Int. Cl.
*H04L 12/26* (2006.01)
*H04L 12/24* (2006.01)
*G06Q 30/06* (2012.01)

(52) U.S. Cl.
CPC .......... *H04L 43/0811* (2013.01); *G06Q 30/06* (2013.01); *H04L 41/0866* (2013.01); *H04L 43/06* (2013.01); *H04L 41/5019* (2013.01)

(58) Field of Classification Search
None
See application file for complete search history.

(56) References Cited

U.S. PATENT DOCUMENTS

| 9,374,281 | B2* | 6/2016 | Dasgupta ............ H04L 41/5025 |
| 2003/0202468 | A1* | 10/2003 | Cain ........................ H04L 45/00 370/229 |
| 2005/0157697 | A1* | 7/2005 | Lee ........................ H04L 45/128 370/349 |
| 2006/0218353 | A1* | 9/2006 | Livet ................... H04L 12/5695 711/141 |

(Continued)

FOREIGN PATENT DOCUMENTS

| CN | 1474614 A | 2/2004 |
| CN | 101127784 A | 2/2008 |

(Continued)

*Primary Examiner* — Eunsook Choi
(74) *Attorney, Agent, or Firm* — Leydig, Voit & Mayer, Ltd.

(57) ABSTRACT

Embodiments of the present invention provide an intermediate node determining method and apparatus, where the method includes: collecting an original data flow used to acquire a target service; based on the original data flow, determining request nodes and response nodes that are in nodes, and determining a connection relationship between the nodes; combining the determined request nodes into a first composite node and the determined response nodes into a second composite node, and determining, based on the determined connection relationship between the nodes, a connection path between the first composite node and the second composite node; and determining, based on a selected optimization objective and from the connection paths, at least one preferred connection path, to acquire an intermediate node on the at least one preferred connection path.

31 Claims, 8 Drawing Sheets

(56) References Cited

U.S. PATENT DOCUMENTS

| | | | |
|---|---|---|---|
| 2009/0198832 A1* | 8/2009 | Shah | H04L 41/0668 709/239 |
| 2009/0279444 A1* | 11/2009 | Ravindran | H04L 41/5003 370/252 |
| 2010/0195535 A1* | 8/2010 | Ziller | H04L 45/123 370/254 |
| 2011/0142159 A1* | 6/2011 | Jeong | H04B 7/024 375/295 |
| 2012/0316903 A1* | 12/2012 | Pendergraft | G06Q 10/0637 705/7.11 |

FOREIGN PATENT DOCUMENTS

| | | |
|---|---|---|
| CN | 103353869 A | 10/2013 |
| WO | WO 2014060226 A1 | 4/2014 |

* cited by examiner

INTERMEDIATE NODE DETERMINING METHOD AND APPARATUS

CROSS-REFERENCE TO RELATED APPLICATIONS

This application claims priority to Chinese Patent Application No. 201410083214.X, filed on Mar. 6, 2014, which is hereby incorporated by reference in its entirety.

TECHNICAL FIELD

The present invention relates to the field of data processing, and in particular, to an intermediate node determining method and apparatus.

BACKGROUND

With continuous development of network technologies, many services may be queried or acquired by using a network. For example, a user may query or buy an air ticket from city 1 to city 2 by using the Ctrip. Com (a tourism website in China).

In real life, an information gap exists between a requester (hereinafter referred to as a request node) of a service and a provider (hereinafter referred to as a response node) of the service. To meet various service requirements of a request node, many intermediate nodes are deployed on a network. A common feature of these intermediate nodes is: having a big data analyzing and processing capability and being capable of providing users with information services. For example, the Baidu search engine can provide users with various information content, website links, and the like that are related to content queried by the users.

Because there are various intermediate nodes on a network, a request node also acquires a service (hereinafter referred to as a target service) in various ways. In the prior art, a request node does not have a clear understanding of intermediate nodes on a network. Therefore, when acquiring a target service, the request node is somewhat aimless in selecting an intermediate node.

SUMMARY

Embodiments of the present invention provide an intermediate node determining method and apparatus, to avoid aimlessness of a request node in selecting an intermediate node.

According to a first aspect, an intermediate node determining method is provided and includes: collecting an original data flow used to acquire a target service, where the original data flow includes information about nodes passed through for acquiring the target service, and the nodes include: request nodes used to request the target service, response nodes used to provide the target service, and an intermediate node that is on a network and has a data analyzing and processing capability to enable the request nodes to acquire the target service; based on the original data flow, determining the request nodes and the response nodes that are in the nodes, and determining a connection relationship between the nodes; combining the determined request nodes into a first composite node and the determined response nodes into a second composite node, and determining, based on the determined connection relationship between the nodes, a connection path between the first composite node and the second composite node; and determining, based on a selected optimization objective and from the connection paths, at least one preferred connection path, to acquire an intermediate node on the at least one preferred connection path.

With reference to the first aspect, in an implementation manner of the first aspect, the based on the original data flow, determining the request nodes and the response nodes that are in the nodes, and determining a connection relationship between the nodes includes: based on a semantic meaning of the original data flow, determining the request nodes and the response nodes that are in the nodes, and determining the connection relationship between the nodes.

With reference to the first aspect or any one of the foregoing implementation manners of the first aspect, in another implementation manner of the first aspect, the based on a semantic meaning of the original data flow, determining the request nodes and the response nodes that are in the nodes, and determining the connection relationship between the nodes includes: extracting, from the original data flow and based on semantic analysis on the original data flow, the information about the nodes, and determining the nodes and the connection relationship between the nodes according to the information; and clustering the determined nodes by using a clustering algorithm, to identify the request nodes and the response nodes that are in the nodes.

With reference to the first aspect or either of the foregoing implementation manners of the first aspect, in another implementation manner of the first aspect, the determining, based on a selected optimization objective and from the connection paths, at least one preferred connection path includes: calculating the number of times the original data flow accesses each connection path between the first composite node and the second composite node; and determining that a connection path, which is in the first N connection paths of all the connection paths in order of the number of times of being accessed, is the preferred connection path, where N is a positive integer.

With reference to the first aspect or any one of the foregoing implementation manners of the first aspect, in another implementation manner of the first aspect, the method further includes: presenting a first data flow diagram, where the first data flow diagram includes the nodes and the connection relationship between the nodes.

With reference to the first aspect or any one of the foregoing implementation manners of the first aspect, in another implementation manner of the first aspect, the method further includes: presenting a second data flow diagram, where the second data flow diagram includes the first composite node, the second composite node, and the connection path.

With reference to the first aspect or any one of the foregoing implementation manners of the first aspect, in another implementation manner of the first aspect, the optimization objective is determined based on at least one of the following factors: quality of service (QoS), connection stability, signal strength, and access frequency.

According to a second aspect, an intermediate node determining apparatus is provided and includes: a collecting unit, configured to collect an original data flow used to acquire a target service, where the original data flow includes information about nodes passed through for acquiring the target service, and the nodes include: request nodes used to request the target service, response nodes used to provide the target service, and an intermediate node that is on a network and has a data analyzing and processing capability to enable the request nodes to acquire the target service; a first determining unit, configured to: based on the original data flow collected by the collecting unit, determine the request nodes and the response nodes that are in the nodes, and determine a connection relationship between the nodes; a second determining unit, configured to combine the request nodes determined by the first determining unit into a first composite node and the response nodes determined by the first determining unit into a second composite node, and determine, based on the connection relationship between the nodes that is determined by the first determining unit, a connection path between the first composite node and the second composite node; and a third determining unit, configured to determine, based on a selected optimization objective and from the connection paths that are determined by the second determining unit, at least one preferred connection path, to acquire an intermediate node on the at least one preferred connection path.

With reference to the second aspect, in an implementation manner of the second aspect, the first determining unit is specifically configured to: based on a semantic meaning of the original data flow, determine the request nodes and the response nodes that are in the nodes, and determine the connection relationship between the nodes.

With reference to the second aspect or any one of the foregoing implementation manner of the second aspect, in another implementation manner of the second aspect, the first determining unit is specifically configured to extract, from the original data flow and based on semantic analysis on the original data flow, the information about the nodes, and determine the nodes and the connection relationship between the nodes according to the information about the nodes; and cluster the determined nodes by using a clustering algorithm, to identify the request nodes and the response nodes that are in the nodes.

With reference to the second aspect or either of the foregoing implementation manners of the second aspect, in another implementation manner of the second aspect, the third determining unit is specifically configured to calculate the number of times the original data flow accesses each connection path between the first composite node and the second composite node; and determine that a connection path, which is in the first N connection paths of all the connection paths in order of the number of times of being accessed, is the preferred connection path, where N is a positive integer.

With reference to the second aspect or any one of the foregoing implementation manners of the second aspect, in another implementation manner of the second aspect, the apparatus further includes: a first presenting unit, configured to present a first data flow diagram, where the first data flow diagram includes the nodes and the connection relationship between the nodes.

With reference to the second aspect or any one of the foregoing implementation manners of the second aspect, in another implementation manner of the second aspect, the apparatus further includes: a second presenting unit, configured to present a second data flow diagram, where the second data flow diagram includes the first composite node, the second composite node, and the connection path.

With reference to the second aspect or any one of the foregoing implementation manners of the second aspect, in another implementation manner of the second aspect, the optimization objective is determined based on at least one of the following factors: quality of service, connection stability, signal strength, and access frequency.

According to a third aspect, a data processing method is provided and includes: collecting, by an intermediate node and from a network, related information of a request node used to request a target service, and collecting service information of multiple response nodes, where the multiple response nodes are all used to provide the target service; analyzing, by the intermediate node, the related information of the request node and the service information of the multiple response nodes, and determining, from target services provided by the multiple response nodes, a first target service matching the related information; and establishing, by the intermediate node, a connection between the request node and a first response node corresponding to the first target service, so that the request node acquires the first target service from the first response node according to the connection. Generally, the intermediate node has a big data analyzing and processing capability.

With reference to the third aspect, in an implementation manner of the third aspect, the request node, the intermediate node, and the first response node are a request node, an intermediate node, and a response node of a triangle model, respectively, and the triangle model refers to a triangle connection formed by the response node acting as a service provider, the intermediate node acting as a broker, and the request node acting as a buyer.

With reference to the third aspect or any one of the foregoing implementation manner of the third aspect, in another implementation manner of the third aspect, the related information of the request node includes identity information of the request node or current-state information of the request node, or the related information of the request node includes both identity information of the request node and current-state information of the request node.

With reference to the third aspect or either of the foregoing implementation manners of the third aspect, in another implementation manner of the third aspect, the service information includes a type of the target service or content of the target service, and the intermediate node determines, by using big data analysis, the first target service matching the related information.

According to a fourth aspect, a data processing apparatus is provided, and the apparatus includes: a collecting unit, configured to: collect, from a network, related information of a request node used to request a target service, and collect service information of multiple response nodes, where the multiple response nodes are all used to provide the target service; a determining unit, configured to analyze the related information of the request node and the service information of the multiple response nodes that are collected by the collecting unit, and determine, from target services provided by the multiple response nodes, a first target service matching the related information; and an establishing unit, configured to establish a connection between the request node and a first response node corresponding to the first target service, so that the request node acquires the first target service from the first response node according to the connection.

With reference to the fourth aspect, in an implementation manner of the fourth aspect, the request node, the intermediate node, and the first response node are a request node, an intermediate node, and a response node of a triangle model, respectively, and the triangle model refers to a triangle connection formed by the response node acting as a service provider, the intermediate node acting as a broker, and the request node acting as a buyer.

With reference to the fourth aspect or any one of the foregoing implementation manner of the fourth aspect, in another implementation manner of the fourth aspect, the apparatus further includes: a receiving unit, configured to receive a request that is sent by the request node and used to acquire the target service.

With reference to the fourth aspect or either of the foregoing implementation manners of the fourth aspect, in another implementation manner of the fourth aspect, a sending unit is specifically configured to proactively push recommendation information to the request node.

With reference to the fourth aspect or any one of the foregoing implementation manners of the fourth aspect, in another implementation manner of the fourth aspect, the related information of the request node includes identity information of the request node or current-state information of the request node, or the related information of the request node includes both identity information of the request node and current-state information of the request node.

With reference to the fourth aspect or any one of the foregoing implementation manners of the fourth aspect, in another implementation manner of the fourth aspect, the service information includes a type of the target service or content of the target service, and the intermediate node determines, by using big data analysis, the first target service matching the related information.

According to a fifth aspect, a network unit establishing method is provided and includes: obtaining an original data flow used to acquire a target service, where the original data flow includes information about nodes passed through for acquiring the target service, and the nodes include: request nodes used to request the target service, response nodes used to provide the target service, and an intermediate node that is on a network and has a data analyzing and processing capability to enable the request nodes to acquire the target service; according to the original data flow, determining the request nodes and the response nodes that are in the nodes, and determining a connection relationship between the nodes; combining the determined request nodes into a request node of a triangle model and the determined response nodes into a response node of the triangle model, and determining a connection path between the first composite node and the second composite node according to the determined connection relationship between the nodes, where the triangle model refers to a triangle connection formed by the response node acting as a service provider, the intermediate node acting as a broker, and the request node acting as a buyer; and determining, based on a selected optimization objective and from the connection paths, at least one preferred connection path, and determining that a network node on the at least one preferred connection path is the intermediate node of the triangle model.

With reference to the fifth aspect, in an implementation manner of the fifth aspect, the according to the original data flow, determining the request nodes and the response nodes that are in the nodes, and determining a connection relationship between the nodes includes: according to a semantic meaning of the original data flow, determining the request nodes and the response nodes that are in the nodes, and determining the connection relationship between the nodes.

With reference to the fifth aspect or any one of the foregoing implementation manner of the fifth aspect, in another implementation manner of the fifth aspect, the according to a semantic meaning of the original data flow, determining the request nodes and the response nodes that are in the nodes, and determining the connection relationship between the nodes includes: extracting, from the original data flow and according to semantic analysis on the original data flow, the information about the nodes, and determining the connection relationship between the nodes according to the information about the nodes; and clustering the extracted nodes by using a clustering algorithm, to identify the request nodes and the response nodes that are in the nodes.

With reference to the fifth aspect or either of the foregoing implementation manners of the fifth aspect, in another implementation manner of the fifth aspect, the determining, based on a selected optimization objective and from the connection paths, at least one preferred connection path includes: calculating the number of times the original data flow accesses each connection path between the request node of the triangle model and the response node of the triangle model; and determining that a connection path, which is in the first N connection paths of all the connection paths in order of the number of times of being accessed, is the preferred connection path, where N is a positive integer.

With reference to the fifth aspect or any one of the foregoing implementation manners of the fifth aspect, in another implementation manner of the fifth aspect, the method further includes: presenting a first data flow diagram, where the first data flow diagram includes the nodes and the connection relationship between the nodes.

With reference to the fifth aspect or any one of the foregoing implementation manners of the fifth aspect, in another implementation manner of the fifth aspect, the method further includes: presenting a second data flow diagram, where the second data flow diagram includes the request node of the triangle model, the response node of the triangle model, and the connection path.

With reference to the fifth aspect or any one of the foregoing implementation manners of the fifth aspect, in another implementation manner of the fifth aspect, the optimization objective is determined based on at least one of the following factors: quality of service, connection stability, signal strength, and access frequency.

According to a sixth aspect, a network unit establishing system is provided and includes: a data flow collecting module, configured to obtain an original data flow used to acquire a target service, where the original data flow includes information about nodes passed through for acquiring the target service, and the nodes include: request nodes used to request the target service, response nodes used to provide the target service, and an intermediate node that is on a network and has a data analyzing and processing capability to enable the request nodes to acquire the target service; a data flow analyzing module, configured to: according to the original data flow obtained by the data flow collecting module, determine the request nodes and the response nodes that are in the nodes, and determine a connection relationship between the nodes; a triangle model analyzing module, configured to combine the request nodes determined by the data flow analyzing module into a request node of a triangle model and the response nodes determined by the data flow analyzing module into a response node of the triangle model, and determine a connection path between the first composite node and the second composite node according to the determined connection relationship between the nodes; determine, based on a selected optimization objective and from the connection paths, at least one preferred connection path, and determine that a network node on the at least one preferred connection path is an intermediate node of the triangle model, where the triangle model refers to a triangle connection formed by the response node acting as a service provider, the intermediate node acting as a broker, and the request node acting as a buyer.

With reference to the sixth aspect, in an implementation manner of the sixth aspect, the data flow analyzing module is specifically configured to: according to a semantic meaning of the original data flow, determine the request nodes and the response nodes that are in the nodes, and determine the connection relationship between the nodes.

With reference to the sixth aspect or any one of the foregoing implementation manner of the sixth aspect, in another implementation manner of the sixth aspect, the data flow analyzing module is specifically configured to extract, from the original data flow and according to semantic analysis on the original data flow, the information about the nodes, and determine the nodes and the connection relationship between the nodes according to the information; and cluster the extracted nodes by using a clustering algorithm, to identify the request nodes and the response nodes that are in the nodes.

With reference to the sixth aspect or either of the foregoing implementation manners of the sixth aspect, in another implementation manner of the sixth aspect, the triangle model analyzing module is specifically configured to calculate the number of times the original data flow accesses each connection path between the request node of the triangle model and the response node of the triangle model; and determine that a connection path, which is in the first N connection paths of all the connection paths in order of the number of times of being accessed, is the preferred connection path, where N is a positive integer.

With reference to the sixth aspect or any one of the foregoing implementation manners of the sixth aspect, in another implementation manner of the sixth aspect, the system further includes: a user-interaction and presenting module, configured to present a first data flow diagram, where the first data flow diagram includes the nodes and the connection relationship between the nodes.

With reference to the sixth aspect or any one of the foregoing implementation manners of the sixth aspect, in another implementation manner of the sixth aspect, the user-interaction and presenting module is further configured to present a second data flow diagram, where the second data flow diagram includes the request node of the triangle model, the response node of the triangle model, and the connection path.

With reference to the sixth aspect or any one of the foregoing implementation manners of the sixth aspect, in another implementation manner of the sixth aspect, the system further includes: a triangle model output module, configured to output the intermediate node that is of the triangle module and determined by the triangle model analyzing module.

With reference to the sixth aspect or any one of the foregoing implementation manners of the sixth aspect, in another implementation manner of the sixth aspect, the optimization objective is determined based on at least one of the following factors: quality of service, connection stability, signal strength, and access frequency.

According to the embodiments of the present invention, an original data flow is collected and analyzed, a preferred connection path between request nodes and response nodes is determined, an intermediate node on the preferred connection path is used to guide selection by the request nodes, so that aimlessness of the request nodes in selecting an intermediate node can be avoided.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
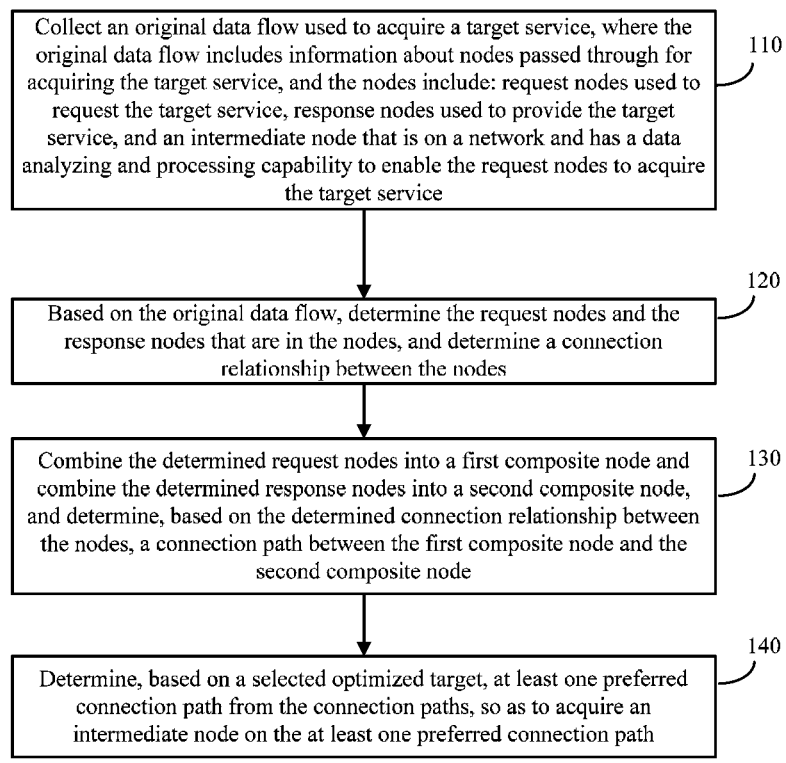
FIG. 1 is a schematic flowchart of an intermediate node determining method according to an embodiment of the present invention.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that a request node in the embodiments of the present invention may be used to request a target service. In an industrial chain, the request node may be a buyer (Buyer) of supply and requisitioning parties. Specifically, the request node may be a user buying a product. For example, if that "user A buys an air ticket from airline company C by using website B" is recorded in an original data flow, user A is the request node. For another example, if that "user D searches for information about automobile insurance by using search engine E, search engine E recommends insurance sales website F to user D, user D accesses insurance sales website F and applies for buying insurance product H from insurance company G, insurance company G acquires related information of user D from a third party credit reporting agency, and user D buys the insurance product H from insurance company G" is recorded in an original data flow, user D is the request node.

It should be understood that a response node in the embodiments of the present invention may be configured to provide a target service. Specifically, in the industrial chain, the response node may be a seller (Seller) of the supply and requisitioning parties. The seller may be a company, a corporation, a self-employed business, or the like. For example, if that "user A buys an air ticket from airline company C by using website B" is recorded in an original data flow, airline company C is the response node. For another example, if that "user D searches for information about automobile insurance by using search engine E, search engine E recommends insurance sales website F to user D, user D accesses insurance sales website F and applies for buying insurance product H from insurance company G, insurance company G acquires related information of user D from a third party credit reporting agency, and user D buys the insurance product from insurance company G" is recorded in an original data flow, insurance company G is the response node.

It should be noted that an intermediate node in the embodiments of the present invention may be a website, a service provider, or the like, which is on a network and has a big data analyzing and processing capability. The intermediate node may act as a third party that collects historical data of the supply and requisitioning parties and current-state information of the supply and requisitioning parties, and may analyze and process the collected data and information. In other words, in the industrial chain, the intermediate node may play a role of a broker (Broker). When a request node requests a target service by using the intermediate node, the intermediate node may recommend at least one seller matching the request node to the request node according to the collected data and information.

It should also be understood that the intermediate node in the embodiments of the present invention may be one node or a set of multiple nodes. In other words, when the intermediate node is a set of multiple nodes, the foregoing functions of the intermediate node may be implemented by the multiple nodes together. For example, if that "user A buys an air ticket from airline company C by using website B" is recorded in an original data flow, website B is the intermediate node. For another example, if that "user D searches for information about automobile insurance by using search engine E, search engine E recommends insurance sales website F to user D, user D accesses insurance sales website F and applies for buying an insurance product from insurance company G, insurance company G acquires related information of user D from third party credit reporting agency H, and user D buys the insurance product from insurance company G" is recorded in an original data flow, search engine E, insurance sales website F, and third party credit reporting agency H are the intermediate nodes.

FIG. 1 is a schematic flowchart of an intermediate node determining method according to an embodiment of the present invention. The method in FIG. 1 may be executed by an apparatus configured to determine an intermediate node. The method in FIG. 1 includes:

110. Collect an original data flow used to acquire a target service, where the original data flow includes information about nodes passed through for acquiring the target service, and the nodes include: request nodes used to request the target service, response nodes used to provide the target service, and an intermediate node that is on a network and has a data analyzing and processing capability to enable the request nodes to acquire the target service.

It should be understood that this embodiment of the present invention imposes no specific limitation on a way in which the original data flow is collected. For example, in an industrial chain, when one target service is achieved, a request node (buyer), a response node (seller), and an intermediate node (broker) may all record information such as the two parties that achieve the target service and a way in which the target service is achieved. For example, in a database of website B, it may be recorded that "driver I buys insurance from automobile insurance company K by using website J". Alternatively, in a database of automobile insurance company K, it is recorded that "driver I buys insurance from automobile insurance company K as recommended by website J". Certainly, the original data flow may also be recorded in another database. For example, website L is specialized in collecting statistics on insurance sales of each automobile insurance company, and the original data flow may be acquired from information recorded by website L.

It should be understood that the target service may not refer to a service of a specific type. For example, the target service may be various services. In other words, when step 110 is implemented, as long as an original data flow for acquiring a service is found, the original data flow is collected, and a type of the service acquired by the data flow does not need to be limited.

It should be understood that the embodiments of the present invention imposes no specific limitation on the number of collected original data flows. In practice, to acquire an intermediate node more accurately, as many original data flows as possible may be collected.

It should be noted that the original data flow may include information about nodes successively passed through for acquiring the target service. In other words, not only the information about the nodes, but also information about a connection relationship between the nodes may be recorded in the original data flow. For example, the original data flow is that "user A buys an air ticket from airline company C by using website B". The original data flow not only includes information about nodes such as user A, website B, and airline company C, but also includes a connection relationship among the nodes: user A-website B-airline company C.

120. Based on the original data flow, determine the request nodes and the response nodes that are in the nodes, and determine a connection relationship between the nodes.

Optionally, in an embodiment, based on semantic analysis on the original data flow, the request nodes and the response nodes that are in the nodes may be determined, and the connection relationship between the nodes may be determined.

Specifically, first, the semantic analysis may be performed on the original data flow, information of the nodes may be extracted from the original data flow, and the connection relationship between the nodes may be determined.

For example, the original data flow is that "user A buys an air ticket from airline company C by using website B". By using an existing algorithm (for example, a pattern recognition algorithm), which may be used in the semantic analysis, nodes, that is, user A, website B, and airline company C, and a connection relationship among user A, website B, and airline company C, that is, "user A-website B-airline company C", may be extracted from the original data flow.

For another example, the original data flow is that "user D searches for information about automobile insurance by using search engine E, search engine E recommends insurance sales website F to user D, user D accesses insurance sales website F and applies for buying an insurance product from insurance company G, insurance company G acquires related information of user D from third party credit reporting agency H, and user D buys the insurance product from insurance company G". By using an existing semantic analyzing algorithm (for example, pattern recognition), nodes, that is, user D, search engine E, insurance sales website F, insurance company G, and third party credit reporting agency H, may be extracted from the original data flow, and a connection relationship among the foregoing nodes, that is, "user D-search engine E-insurance sales website F-insurance company G-third party credit reporting agency H", may be determined.

The foregoing only extracts, from the original data flow, the nodes and a connection relationship between the nodes, but does not distinguish a node type of each node.

Then, the extracted nodes may be clustered by using a clustering algorithm, to identify the request nodes and the response nodes that are in the nodes.

For example, a specific process of the clustering algorithm may be as follows:

Step 1: Determine a classification value set C which equals is {request nodes, an intermediate node, response nodes}.

Optionally, a classification value set C which equals is {request nodes, response nodes} may also be determined. After the request nodes and the response nodes are identified from the nodes that are extracted from the original data flow, a remaining node is used as the intermediate node.

Step 2: Determine a classification rule.

The classification rule may be determined in various manners. For example, a set of classification rules may be selected from pre-stored default classification rules; or a study sample may be extracted from the original data flow, and then, a set of classification rules is obtained by studying by using a method of artificial intelligence.

For example, one or more of the following rules may be used as the classification rule.

Rule 1: In the original data flow, a subject of a verb, such as "buy", "order", or "query", is the request node.

Rule 2: In the original data flow, a subject of a verb, such as "sell" or "deliver", is the response node.

Rule 3: In the original data flow, an object of a preposition, such as "through", "according to", or "based on", is the intermediate node.

Rule 4: In the original data flow, an object of a verb, such as "query" or "search", is the intermediate node.

Step 3: Select a training sample, and verify reliability of the classification rule.

For example, a proportion of the original data flows may be selected as the training sample; and a selected classification rule is then applied to the training sample.

For example, one sample (which is corresponding to one original data flow) in training samples is that "user A buys an air ticket from airline company C by using website B."

The foregoing four rules are separately applied to the sample, and the following classification results may be obtained by analysis:

| Node Name | Node Type | Applied Rule | Original Data Flow |
|---|---|---|---|
| User A | Request node | Rule 1 | User A buys an air ticket from airline company C by using website B |
| Website B | Intermediate node | Rule 3 | User A buys an air ticket from airline company C by using website B |

Similarly, the classification rule determined in step 2 may be applied to each sample in the training samples, to obtain classification results similar to those in the foregoing table. Then, reliability $R(i)$ of each classification rule may be evaluated according to classification accuracy of each classification rule. The reliability may be determined by using the following formula:

$R(i)$=(the number of times that a rule $i$ is classified correctly in training samples)/(the number of times that the rule $i$ is applied to the training samples).

A rule in which $R(i)$ is less than a threshold (for example, 80%) is adjusted and optimized, or the rule is deleted.

Step 4: Apply the finally determined classification rule to all the original data flows, to identify the request nodes and the response nodes that are in the nodes included in the original data flows.

130. Combine the determined request nodes into a first composite node and the determined response nodes into a second composite node, and determine, based on the determined connection relationship between the nodes, a connection path between the first composite node and the second composite node.

Herein, not only the determined request nodes are combined into a composite node (that is, the foregoing first composite node), but also a connection relationship between each request node and another node is converted into a connection relationship between the first composite node and another node. For example, request node 1 is connected to intermediate node 1, and request node 2 is connected to intermediate node 2. After request node 1 and request node 2 are combined into one composite node, the composite node is connected to both intermediate node 1 and intermediate node 2.

A manner of combining the response nodes is the same as that of combining the request nodes, which is not described herein again.

After the request nodes and the response nodes are combined in the foregoing manner, it may be determined, according to connection relationships between the first composite node and another node and between the second composite node and another node, that by connection relationships with which nodes can the first composite node reaches the second composite node. It is determined that different connection relationships used for the first composite node to reach the second composite node are different connection paths from the first composite node to the second composite node.

Specifically, a connection path may be determined in the following manner:

First, create a connection matrix L.

Specifically, it is assumed that the following nodes: the first composite node, the second composite node, and five intermediate nodes, are determined after the foregoing steps, and connection relationships between these nodes are shown in the following table.

| | First Composite Node | Intermediate Node 1 | Intermediate Node 2 | Intermediate Node 3 | Intermediate Node 4 | Intermediate Node 5 | Second Composite Node |
|---|---|---|---|---|---|---|---|
| First Composite Node | 0 | 1 | 0 | 0 | 1 | 0 | 1 |
| Intermediate Node 1 | 1 | 0 | 1 | 0 | 0 | 0 | 0 |

| | First Composite Node | Intermediate Node 1 | Intermediate Node 2 | Intermediate Node 3 | Intermediate Node 4 | Intermediate Node 5 | Second Composite Node |
|---|---|---|---|---|---|---|---|
| Intermediate Node 2 | 0 | 1 | 0 | 1 | 0 | 0 | 0 |
| Intermediate Node 3 | 0 | 0 | 1 | 0 | 0 | 0 | 1 |
| Intermediate Node 4 | 1 | 0 | 0 | 0 | 0 | 1 | 0 |
| Intermediate Node 5 | 0 | 0 | 0 | 0 | 1 | 0 | 1 |
| Second Composite Node | 1 | 0 | 0 | 1 | 0 | 1 | 0 |

"1" indicates that there is a connection relationship between two nodes; "0" indicates that there is no connection relationship between two nodes. For example, row 3 column 2 in the table is 1, which indicates that intermediate node 1 in row 3 has a connection relationship with a first composite node in column 2.

According to the foregoing connection relationships between the nodes, a connection matrix may be obtained:

$$L = \begin{bmatrix} 0 & 1 & 0 & 0 & 1 & 0 & 1 \\ 1 & 0 & 1 & 0 & 0 & 0 & 0 \\ 0 & 1 & 0 & 1 & 0 & 0 & 0 \\ 0 & 0 & 1 & 0 & 0 & 0 & 1 \\ 1 & 0 & 0 & 0 & 0 & 1 & 0 \\ 0 & 0 & 0 & 0 & 1 & 0 & 1 \\ 1 & 0 & 0 & 1 & 0 & 1 & 0 \end{bmatrix}.$$

Connotation indicated by L is the same as the foregoing table, and may be considered as a mathematical representation form of content in the foregoing table.

Second, calculate, based on connection matrix L, all connection paths from the first composite node to the second composite node.

Specifically, it may start with an element in the left upper corner of matrix L and traverse the row rightwards. When an element "1" is encountered, it is changed into traversing downwards. When an element "1" is encountered, it is changed into traversing the row rightwards again. The process is repeated in this way until the last row or the last column is reached. Elements "1" passed through form a connection path from the first composite node to the second composite node. For example, the first row of matrix L is first traversed rightwards, and an element $L_{12}=1$ is found; the second column of matrix L is then traversed downwards, and an element $L_{32}=1$ is found; the third row of matrix L is then traversed rightwards, and an element $L_{34}=1$ is found; and after that, the fourth column of matrix L is traversed downwards, and an element $L_{74}=1$ is found. Because $L_{74}$ is in the last row of matrix L, the traversal ends. After the foregoing traversal process, a connection path $L_{12}$-$L_{32}$-$L_{34}$-$L_{74}$ is found. It may be seen from the foregoing table that the $L_{12}$-$L_{32}$-$L_{34}$-$L_{74}$ represents the first composite node-intermediate node 1-intermediate node 2-intermediate node 3-the second composite node. A search process of a remaining path is similar, and it is only required to exclude a connection path that has been identified, and details are not described herein again.

140. Determine, based on a selected optimization objective and from the connection paths, at least one preferred connection path, to acquire an intermediate node on the at least one preferred connection path.

The preferred connection path described in this application refers to a connection path meets the optimization objective. The optimization objective is determined based on at least one of the following factors: quality of service, connection stability, signal strength, access frequency, and another parameter mentioned in the following embodiments. For example, the optimization objective may be determined based on quality of service, and in other words, the optimization objective may be selecting a connection path whose quality of service is higher than a threshold; or, the optimization objective may be determined based on quality of service and connection stability, and in other words, the optimization objective may be selecting a connection path whose quality of service and connection stability are both higher than a threshold.

In practice, at least one optimal connection path may be determined based on a selected optimization objective and from the connection paths, to acquire an intermediate node on the at least one optimal connection path. It should be understood that optimal herein is an ideal value. In practice, an objective of step 140 is to select, from the connection paths determined in step 130, a connection path meeting a performance requirement, for example, meeting a user experience requirement or a connection performance requirement. When a sub-optimal connection path meets the performance requirement, the sub-optimal connection path may also be considered as one of at least one optimal connection path in step 140.

In the embodiments of the present invention, an original data flow is collected and analyzed, an optimal connection path or a preferable connection path that meets a selected optimization objective and is between request nodes and response nodes is determined, an intermediate node on the optimal or preferred connection path is used to guide selection by the request nodes, so that aimlessness of the request nodes in selecting an intermediate node can be avoided.

Optionally, in an embodiment, step 140 may include: calculating the number of times the original data flow accesses each connection path between the first composite node and the second composite node; and determining that a connection path, which is in the first N connection paths of all the connection paths in order of the number of times of being accessed, is the preferred connection path, where N is a positive integer. It should be noted that if the foregoing original data flow is a data flow generated and collected in a predetermined period of time, the optimization objective herein may further be identifying a connection path that is with highest access frequency and between the first composite node and the second composite node within the time.

The access frequency herein may be a ratio of the number of times of being accessed to a length of the predetermined time.

One original data flow may be corresponding to one connection path. As long as the number of times each connection path is accessed by a collected original data flow is calculated, the foregoing preferred connection path may be obtained.

Specifically, when the connection relationship between the nodes is determined based on the original data flow, the number of times each type of connection relationship occurs may be recorded. It should be noted that, if an intermediate node is connected to a request node, it may be considered as that the intermediate node is connected to the first composite node; if an intermediate node is connected to a response node, it may be considered as that the intermediate node is connected to the second composite node.

Then, if a determined path is "the first composite node-intermediate node 1-intermediate node 2-intermediate node 3-the second composite node", for "the first composite node-intermediate node 1", "intermediate node 1-intermediate node 2", "intermediate node 2-intermediate node 3", and "intermediate node 3-the second composite node", the number of times each of these connection relationships occurs may be added, to obtain the total number of times the connection path is accessed. Similarly, the total number of times all connection paths from the first composite node to the second composite node are accessed may be calculated, and a connection path, which is ranked as a first N connection path in order of the number of times of being accessed, is selected as the preferred connection path.

It should be noted that selecting a preferred connection path according to the number of times of being accessed is only an embodiment. In practice, another optimization objective may also be selected. For example, a connection path with the minimum number of intermediate nodes is selected as a preferred connection path or an optimal connection path.

It should be further noted that an intermediate node, which is also referred to as an intermediate node set, on at least one preferred path may be acquired in this embodiment of the present invention.

Optionally, in an embodiment, the method in FIG. 1 may further include: presenting a first data flow diagram, where the first data flow diagram includes the nodes and the connection relationship between the nodes; and presenting a second data flow diagram, where the second data flow diagram includes the first composite node, the second composite node, and the connection path.

Figure 2:
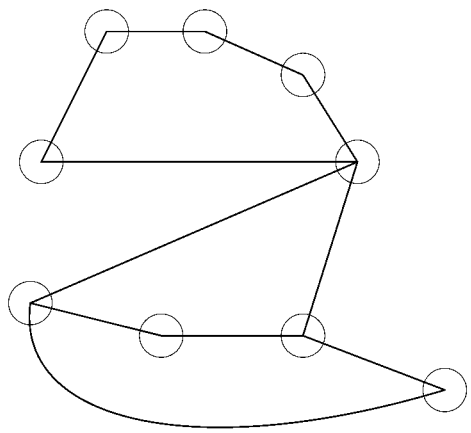
FIG. 2 is an exemplary diagram of a first data flow diagram.
Figure 3:
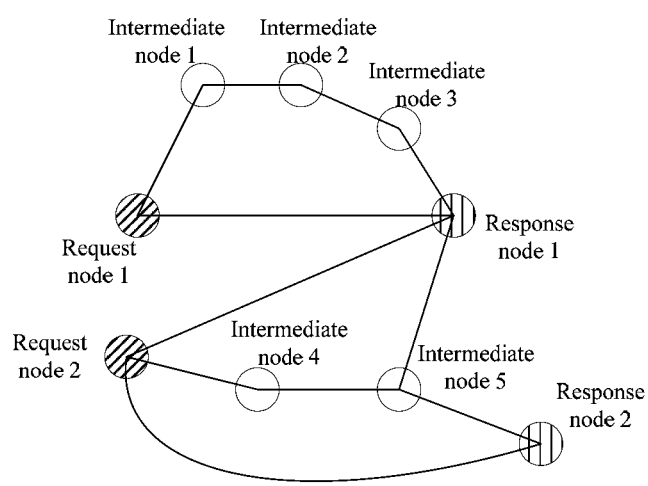
FIG. 3 is another exemplary diagram of a first data flow diagram.

Specifically, both FIG. 2 and FIG. 3 are exemplary diagrams of the first data flow diagram. FIG. 2 presents nodes extracted from the original data flow, and the connection relationship between the nodes, but the nodes are not clustered. When clustering is completed, the first data flow diagram is shown in FIG. 3, and a node type of each node is shown in FIG. 3.

Figure 4:
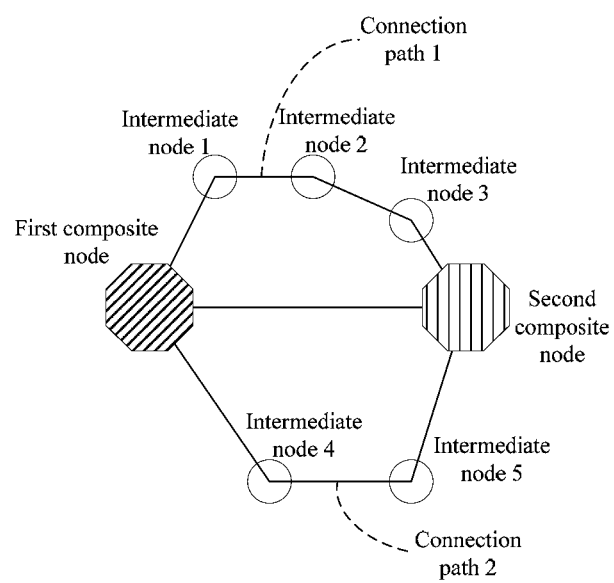
FIG. 4 is an exemplary diagram of a second data flow diagram.

Then, combination of the request nodes and that of the response nodes are performed based on FIG. 3. Results of the combinations are shown in FIG. 4. It may be seen clearly from FIG. 4 that, there are two connection paths from the first composite node to the second composite node (except a direct path between the first composite node and the second composite node). The two connection paths are connection path 1 "the first composite node-intermediate node 1-intermediate node 2-intermediate node 3-the second composite node" and connection path 2 "the first composite node-intermediate node 4-intermediate node 5-the second composite node".

The method in FIG. 1 may further include: analyzing data content exchanged between the acquired intermediate nodes, and providing a suggestion on how to better integrate these intermediate nodes, to instruct transformation of an industrial chain.

An intermediate node may be acquired by using the method in FIG. 1. Then, a big data analyzing capability of the intermediate node may help establish a convenient and fast bridge between the request nodes and the response nodes. In other words, it is equivalent to that a triangle model that includes the request nodes, the intermediate node, and the response nodes is established, and efficiency of an industrial chain may be improved greatly by using the triangle model.

Figure 5:
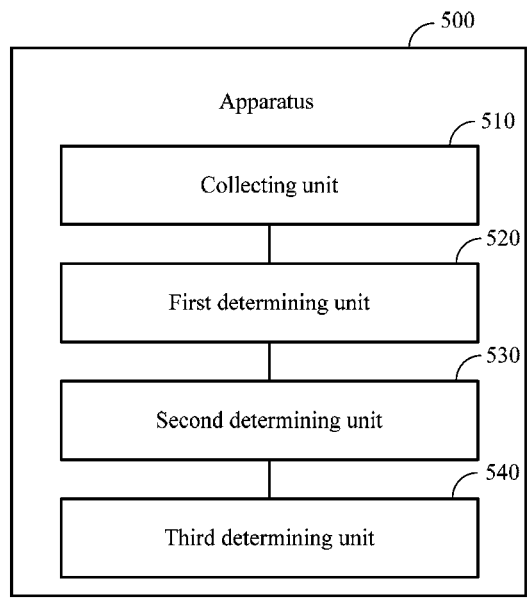
FIG. 5 is a schematic structural diagram of an intermediate node determining apparatus according to an embodiment of the present invention.
Figure 6:
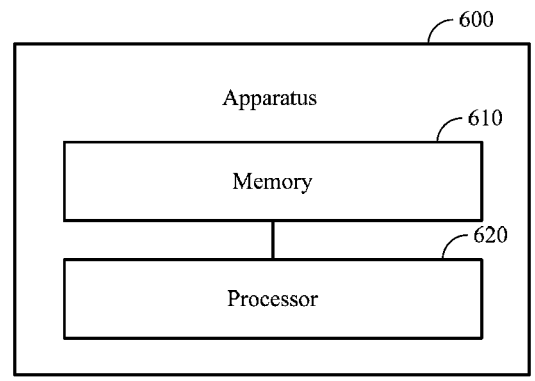
FIG. 6 is a schematic structural diagram of an intermediate node determining apparatus according to an embodiment of the present invention.

The foregoing describes in detail an intermediate node determining method with reference to FIG. 1 to FIG. 4, and the following describes in detail an intermediate node determining apparatus with reference to FIG. 5 to FIG. 6.

FIG. 5 is a schematic structural diagram of an intermediate node determining apparatus according to an embodiment of the present invention. An apparatus 500 in FIG. 5 can implement the steps in FIG. 1 to FIG. 4, which, to avoid repetition, are not described in detail again. The apparatus 500 includes a collecting unit 510, a first determining unit 520, a second determining unit 530, and a third determining unit 540.

The collecting unit 510 is configured to collect an original data flow used to acquire a target service, where the original data flow includes information about nodes passed through for acquiring the target service, and the nodes include: request nodes used to request the target service, response nodes used to provide the target service, and an intermediate node that is on a network and has a data analyzing and processing capability to enable the request nodes to acquire the target service.

The first determining unit 520 is configured to: based on the original data flow collected by the collecting unit 510, determine the request nodes and the response nodes that are in the nodes, and determine a connection relationship between the nodes.

The second determining unit 530 is configured to combine the request nodes determined by the first determining unit 520 into a first composite node and the response nodes determined by the first determining unit 520 into a second composite node, and determine, based on the connection relationship between the nodes that is determined by the first determining unit 520, a connection path between the first composite node and the second composite node.

The third determining unit 540 is configured to determine, based on a selected optimization objective and from the connection paths that are determined by the second determining unit 530, at least one preferred connection path, to acquire an intermediate node on the at least one preferred connection path. In specific implementation, at least one optimal connection path may be determined based on the selected optimization objective and from the connection paths determined by the second determining unit 530, to acquire an intermediate node on the at least one optimal connection path.

In this embodiment of the present invention, an original data flow is collected and analyzed, a preferred connection path that meets a selected optimization objective and is between request nodes and response nodes is determined, an intermediate node on the preferred connection path is used to guide selection by the request nodes, so that aimlessness of the request nodes in selecting an intermediate node can be avoided.

Optionally, in an embodiment, the first determining unit 520 is specifically configured to: based on a semantic meaning of the original data flow, determine the request nodes and the response nodes that are in the nodes, and determine the connection relationship between the nodes.

Optionally, in another embodiment, the first determining unit 520 is specifically configured to extract, from the original data flow and based on semantic analysis on the original data flow, the information about the nodes, and determine the nodes and the connection relationship between the nodes according to the information about the nodes; and cluster the determined and extracted nodes by using a clustering algorithm, to identify the request nodes and the response nodes that are in the nodes.

Optionally, in another embodiment, the third determining unit 540 is specifically configured to calculate the number of times the original data flow accesses each connection path between the first composite node and the second composite node; and determine that a connection path, which is in the first N connection paths of all the connection paths in order of the number of times of being accessed, is the preferred connection path, where N is a positive integer.

Optionally, in another embodiment, the apparatus 500 may further include: a first presenting unit, configured to present a first data flow diagram, where the first data flow diagram includes the nodes and the connection relationship between the nodes.

Optionally, in another embodiment, the apparatus 500 may further include: a second presenting unit, configured to present a second data flow diagram, where the second data flow diagram includes the first composite node, the second composite node, and the connection path.

Optionally, in another embodiment, the optimization objective is determined based on at least one of the following factors: quality of service, connection stability, signal strength, and access frequency.

FIG. 6 is a schematic structural diagram of an intermediate node determining apparatus according to an embodiment of the present invention. An apparatus 600 in FIG. 6 can implement the steps in FIG. 1 to FIG. 4, which, to avoid repetition, are not described in detail again. The apparatus 600 includes a memory 610 and a processor 620.

The memory 610 is configured to store a program.

The processor 620 is configured to execute the program, and when the program stored in the memory 610 is executed, the processor 620 is configured to collect an original data flow used to acquire a target service, where the original data flow includes information about nodes passed through for acquiring the target service, and the nodes include: request nodes used to request the target service, response nodes used to provide the target service, and an intermediate node that is on a network and has a data analyzing and processing capability to enable the request nodes to acquire the target service; based on the original data flow, determine the request nodes and the response nodes that are in the nodes, and determine a connection relationship between the nodes; combine the determined request nodes into a first composite node and the determined response nodes into a second composite node, and determine, based on the connection relationship between the nodes, a connection path between the first composite node and the second composite node; and determine, from the connection paths, at least one preferred connection path, to acquire an intermediate node on the at least one preferred connection path. In specific implementation, based on a selected optimization objective and from the connection paths, at least one preferable or optimal connection path may be determined, to acquire an intermediate node on the at least one preferable or optimal connection path.

According to this embodiment of the present invention, an original data flow is collected and analyzed, a preferred connection path between request nodes and response nodes is determined, an intermediate node on the preferred connection path is used to guide selection by the request nodes, so that aimlessness of the request nodes in selecting an intermediate node can be avoided.

Optionally, in an embodiment, the processor 620 is specifically configured to: based on a semantic meaning of the original data flow, determine the request nodes and the response nodes that are in the nodes, and determine the connection relationship between the nodes.

Optionally, in another embodiment, the processor 620 is specifically configured to extract, from the original data flow and based on semantic analysis on the original data flow, the information about the nodes, and determine the nodes and the connection relationship between the nodes according to the information about the nodes; and cluster the determined nodes by using a clustering algorithm, to identify the request nodes and the response nodes that are in the nodes.

Optionally, in another embodiment, the processor 620 is specifically configured to calculate the number of times the original data flow accesses each connection path between the first composite node and the second composite node; and determine that a connection path, which is in the first N connection paths of all the connection paths in order of the number of times of being accessed, is the preferred connection path, where N is a positive integer.

Optionally, in another embodiment, the apparatus 600 may further include: a display, configured to present a first data flow diagram, where the first data flow diagram includes the nodes and the connection relationship between the nodes; and present a second data flow diagram, where the second data flow diagram includes the first composite node, the second composite node, and the connection path.

Optionally, in another embodiment, the foregoing optimization objective is determined based on at least one of the following factors: quality of service, connection stability, signal strength, and access frequency.

In the prior art, a response node provides a request node with a target service. However, because a data collecting and analyzing capability of the response node is limited, it needs to take a long time to obtain a target service matching the request node, which causes low efficiency in acquiring the target service. For example, when an automobile insurance company recommends an automobile insurance policy to an automobile owner, to obtain an accurate requirement of the automobile owner, a lot of related information of the automobile owner needs to be collected, for example, automobile violation information is collected from a traffic police brigade; automobile status information is collected from an automobile service factory; and driving habits of the automobile owner is collected from third party information providers. However, because the automobile insurance company is limited by its information collecting capability, it needs to take a long time to collect the foregoing information with low efficiency.

Digitization has an increasing impact on our daily life. With the development of digitization, big data analysis becomes an important analysis tool.

Figure 7:
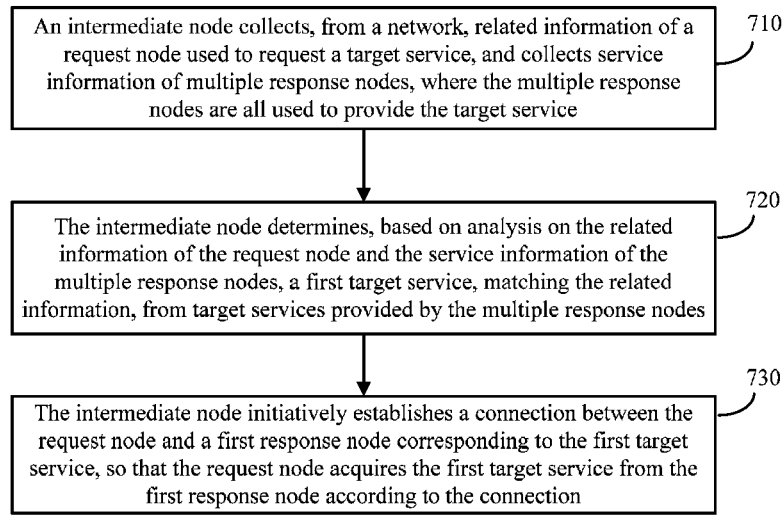
FIG. 7 is a schematic flowchart of a data processing method according to an embodiment of the present invention.

The following describes how an intermediate node establishes a connection between a request node and a response node with reference to FIG. 7 and from a perspective of the intermediate node that has a big data analyzing capability.

FIG. 7 is a schematic flowchart of a data processing method according to an embodiment of the present invention. The method in FIG. 7 may be executed by an intermediate node. The method in FIG. 7 includes:

710. An intermediate node collects, from a network, related information of a request node used to request a target service, and collects service information of multiple response nodes, where the multiple response nodes are all used to provide the target service.

It should be understood that this embodiment imposes no specific limitation on the related information of the request node. The related information of the request node may include information that needs to be provided by the request node to acquire the target service. Specifically, the related information of the request node includes identity information of the request node or current-state information of the request node; or the related information of the request node may include both identity information of the request node and current-state information of the request node. The current-state information may include a current location, occasion, mood, or the like of the request node.

It should be understood that the foregoing service information may be information such as a type of the target service, content of the target service, market positioning of the service, and a periodic discount.

For example, the request node may be an automobile driver or an automobile owner; the response nodes may be automobile insurance companies; and the intermediate node may be a third party data collecting and analyzing service provider. The foregoing related information may include historical accidents and automobile status of each automobile (for example, an age and mileage of the automobile), a driving habit, a regular driving route, current physical and mental conditions of a driver, and the like. The foregoing service information may include a type of an automobile insurance policy provided by each automobile insurance company, a target market, a current discount, and the like.

It should be noted that, the foregoing are only examples for description, and the present invention imposes no limitation on specific types of the request node, the response nodes, and the intermediate node. For example, the request node may be a debtor, the response nodes may be creditors, and the intermediate node may be a third party data collecting and analyzing service provider. Alternatively, the request node may be a patient, the response nodes may be medical care/life insurance companies, and the intermediate node may be a third party medical data collecting and analyzing service provider. Alternatively, the request node may be a communication service consumer, the response nodes may be communications service providers, and the intermediate node may be a third party data collecting and analyzing service provider. Alternatively, the request node may be a patient, the response nodes may be pharmaceutical manufacturers, and the intermediate node may be a third party medical data collecting and analyzing service provider.

720. The intermediate node determines, from target services provided by the multiple response nodes and based on analysis on the related information of the request node and the service information of the multiple response nodes, a first target service matching the related information.

The foregoing intermediate node may determine, by using big data analysis, the first target service matching the related information.

For example, the intermediate node analyzes information such as a driving habit and a physical condition of an automobile driver, and a historical situation of an automobile, and analyzes a type of an automobile insurance policy provided by an automobile insurance company, a current discount, and the like. The intermediate node finds, according to a result of the analysis, an automobile policy best matching the automobile driver.

730. The intermediate node proactively establishes a connection between the request node and a first response node corresponding to the first target service, so that the request node acquires the first target service from the first response node according to the connection.

For example, the intermediate node may send a list to the automobile driver. The list includes an automobile insurance company that can provide the automobile driver with an automobile insurance best matching a condition of the automobile driver or an automobile insurance policy best matching a situation of the automobile driver among these automobile insurance companies, or both are included.

Optionally, in an embodiment, the request node, the intermediate node, and the first response node are a request node, an intermediate node, and a response node of a triangle model, respectively, and the triangle model refers to a triangle connection formed by the response node acting as a service provider, the intermediate node acting as a broker, and the request node acting as a buyer.

It should be understood that the request node of the triangle model in this embodiment of the present invention is one endpoint of the triangle model, the response node of the triangle model is another endpoint of the triangle model; and the intermediate node of the triangle model is a network node. The triangle model is used to indicate that a simplest connection between the two endpoints of the triangle model can be implemented by using the intermediate node of the triangle model.

Optionally, in another embodiment, before step 730, the method in FIG. 7 may further include: receiving, by the intermediate node, a request that is sent by the request node and used to acquire the target service.

Optionally, in another embodiment, before step 730, the method in FIG. 7 may further include: pushing proactively, by the intermediate node, recommendation information to the request node.

In this embodiment of the present invention, an intermediate node collects, from a network, related information of each request node and service information of a response node by using a big data analyzing capability, analyzes the related information of the request node and the service information of the response node to recommend a suitable response node to the request node, and therefore, the response node does not need to collect the related information of the request node by itself, thereby improving efficiency of acquiring a target service.

Figure 8:
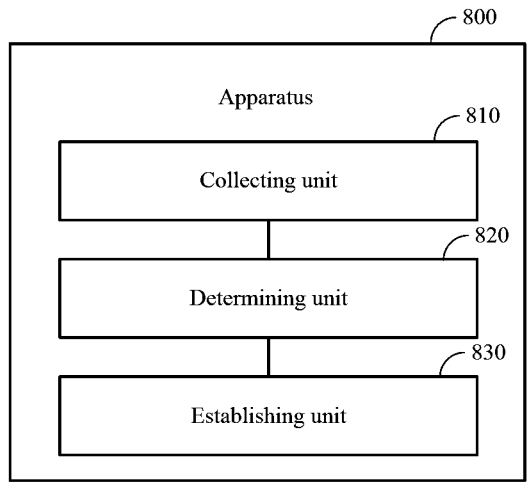
FIG. 8 is a schematic structural diagram of a data processing apparatus according to an embodiment of the present invention.
Figure 9:
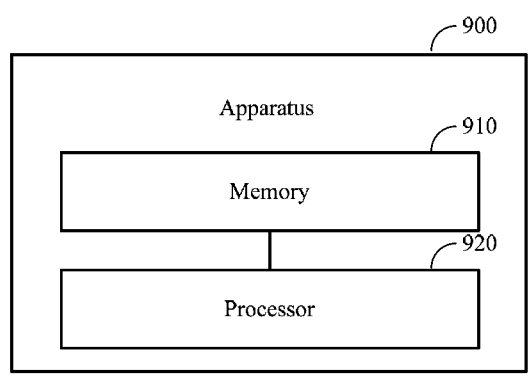
FIG. 9 is a schematic structural diagram of a data processing apparatus according to an embodiment of the present invention.

The foregoing describes in detail the data processing method in an embodiment of the present invention with reference to FIG. 7, and the following describes in detail a data processing apparatus in an embodiment of the present invention with reference to FIG. 8 to FIG. 9.

FIG. 8 is a schematic structural diagram of a data processing apparatus according to an embodiment of the present invention. It should be understood that an apparatus 800 in FIG. 8 can implement the steps in FIG. 7, which, to avoid repetition, are not described in detail herein again. The apparatus 800 includes:

a collecting unit 810, configured to: collect, from a network, related information of a request node used to request a target service, and collect service information of multiple response nodes, where the multiple response nodes are all used to provide the target service;

a determining unit 820, configured to determine, from the target services provided by the multiple response nodes and based on analysis on the related information of the request node and the service information of the multiple response nodes that are collected by the collecting unit 810, a first target service matching the related information; and an establishing unit 830, configured to proactively establish a connection between the request node and a first response node corresponding to the first target service, so that the request node acquires the first target service from the first response node according to the connection.

In this embodiment of the present invention, an intermediate node collects, from a network, related information of each request node and service information of a response node by using a big data analyzing capability, analyzes the related information of the request node and the service information of the response node to recommend a suitable response node to the request node, and therefore, the response node does not need to collect the related information of the request node by itself, thereby improving efficiency of acquiring a target service.

Optionally, in an embodiment, the request node, the intermediate node, and the first response node are a request node, an intermediate node, and a response node of a triangle model, respectively, and the triangle model refers to a triangle connection formed by the response node acting as a service provider, the intermediate node acting as a broker, and the request node acting as a buyer.

Optionally, in an embodiment, the apparatus 800 further includes: a receiving unit, configured to receive a request that is sent by the request node and used to acquire the target service.

Optionally, in another embodiment, the establishing unit 830 is specifically configured to proactively push the recommendation information to the request node.

Optionally, in another embodiment, the related information of the request node includes identity information of the request node or current-state information of the request node; or the related information of the request node may include both identity information of the request node and current-state information of the request node.

Optionally, in another embodiment, the service information includes a type of the target service or content of the target service, and the intermediate node determines, by using big data analysis, the first target service matching the related information.

FIG. 9 is a schematic structural diagram of a data processing apparatus according to an embodiment of the present invention. It should be understood that an apparatus 900 in FIG. 9 can implement the steps in FIG. 7, which, to avoid repetition, are not described in detail herein again. The apparatus 900 includes:

a memory 910, configured to store a program; and a processor 920, configured to execute the program; and when the program stored in the memory 910 is executed, the processor 920 is configured to: collect, from a network, related information of a request node used to request a target service, and collect service information of multiple response nodes, where the multiple response nodes are all used to provide the target service; determine, from target services provided by the multiple response nodes and based on analysis on the related information of the request node and the service information of the multiple response nodes, a first target service matching the related information; and establish a connection between the request node and a first response node corresponding to the first target service, so that the request node acquires the first target service from the first response node according to the connection.

In this embodiment of the present invention, an intermediate node collects, from a network, related information of each request node and service information of a response node by using a big data analyzing capability, analyzes the related information of the request node and the service information of the response node to recommend a suitable response node to the request node, and therefore, the response node does not need to collect the related information of the request node by itself, thereby improving efficiency of acquiring a target service.

Optionally, in an embodiment, the request node, the intermediate node, and the first response node are a request node, an intermediate node, and a response node of a triangle model, respectively, and the triangle model refers to a triangle connection formed by the response node acting as a service provider, the intermediate node acting as a broker, and the request node acting as a buyer.

Optionally, in an embodiment, the processor 920 is further configured to receive a request that is sent by the request node and used to acquire the target service.

Optionally, in another embodiment, the processor 920 is specifically configured to proactively push the recommendation information to the request node.

Optionally, in another embodiment, the related information of the request node includes identity information of the request node or current-state information of the request node; or the related information of the request node may include both identity information of the request node and current-state information of the request node.

Optionally, in another embodiment, the service information includes a type of the target service or content of the target service, and the intermediate node determines, by using big data analysis, the first target service matching the related information.

A triangle model method is an effective method for performing information-based transformation on an existing industrial chain, simplifying the industrial chain, and improving efficiency of the entire industry based on analysis on a data flow. An objective of the triangle model method is to remove a redundant process between two points, and achieve a simplest connection between the two points. With the development of network technologies, in the existing industrial chain, a key point of a triangle model is establishing a network node (for example, a broker) between a request node and a response node (for example, a buyer and a seller). The network node has a big data collecting and analyzing capability, and can provide the request node and the response node with information required by the two nodes, establish an effective connection between the request node and the response node, and eliminate an information gap between the request node and the response node.

However, in the existing industrial chain, there are various network nodes, and how to establish a network unit of a triangle model is urgent to be resolved. A network unit of a triangle model is a network model unit formed by connecting network nodes of three parties on a network. In implementation, a specific application network connection may be established based on a network model unit.

Figure 10:
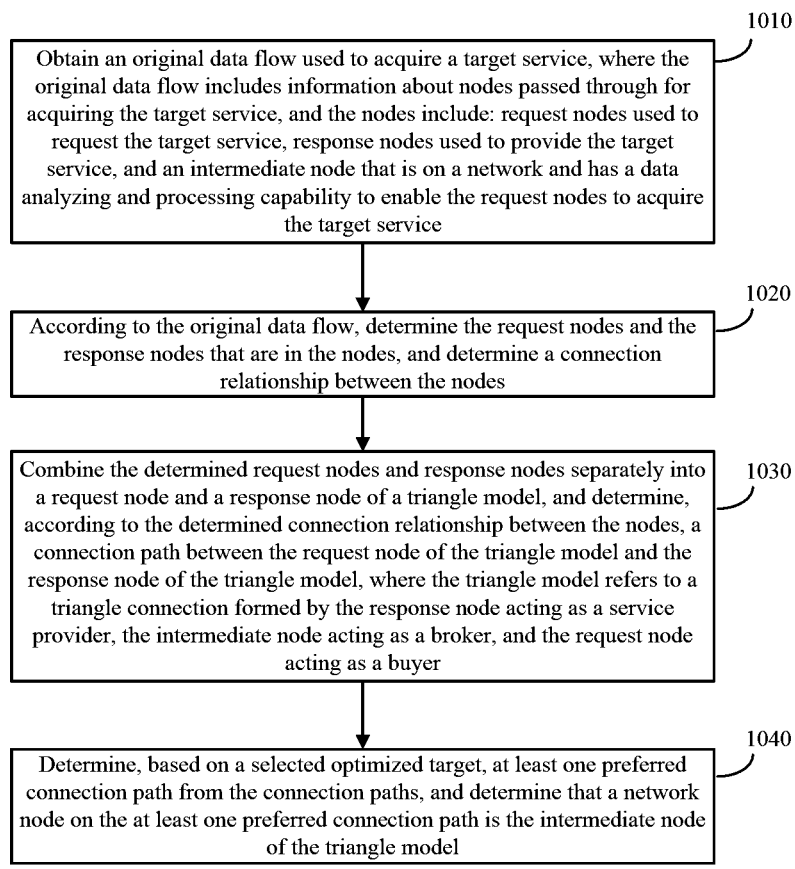
FIG. 10 is a schematic flowchart of a network unit establishing method according to an embodiment of the present invention.

FIG. 10 is a schematic flowchart of a network unit establishing method according to an embodiment of the present invention. It should be understood that, FIG. 10 and FIG. 1 to FIG. 4 are descriptions from two different perspectives, a specific executing process of steps 1010 to 1040 is the same as that of steps 110 to 140, which, to avoid repetition, is not described herein again. The method in FIG. 10 includes:

1010. Obtain an original data flow used to acquire a target service, where the original data flow includes information about nodes passed through for acquiring the target service, and the nodes include: request nodes used to request the target service, response nodes used to provide the target service, and an intermediate node that is on a network and has a data analyzing and processing capability to enable the request nodes to acquire the target service.

1020. According to the original data flow, determine the request nodes and the response nodes that are in the nodes, and determine a connection relationship between the nodes.

1030. Combine the determined request nodes into a request node of a triangle model and the determined response nodes into a response node of the triangle model, and determine, a connection path between the first composite node and the second composite node according to the determined connection relationship between the nodes, where the triangle model refers to a triangle connection formed by the response node acting as a service provider, the intermediate node acting as a broker, and the request node acting as a buyer.

It should be understood that the request node of the triangle model in this embodiment of the present invention is one endpoint of the triangle model, the response node of the triangle model is another endpoint of the triangle model; and the intermediate node of the triangle model is the intermediate node of the triangle node. The triangle model is used to indicate that a simplest connection between the two endpoints of the triangle model can be implemented by using the intermediate node of the triangle model.

1040. Determine, based on a selected optimization objective and from the connection paths, at least one preferred connection path, and determine that a network node on the at least one preferred connection path is the intermediate node of the triangle model.

In this embodiment of the present invention, by using analysis on an original data flow used to acquire a target service, request nodes, response nodes, and a connection path between the request nodes and the response nodes are determined from the original data flow, a preferred path is selected from the determined connection paths, and a network node on the preferred connection path is used as an intermediate node of a triangle model, to establish the triangle model between the request nodes and the response nodes.

Optionally, in an embodiment, the according to the original data flow, determining the request nodes and the response nodes that are in the nodes, and determining a connection relationship between the nodes includes: according to a semantic meaning of the original data flow, determining the request nodes and the response nodes that are in the nodes, and determining the connection relationship between the nodes.

Optionally, in another embodiment, the according to a semantic meaning of the original data flow, determining the request nodes and the response nodes that are in the nodes, and determining the connection relationship between the nodes includes: extracting, from the original data flow and according to semantic analysis on the original data flow, the information about the nodes, and determining the nodes and the connection relationship between the nodes according to the information; and clustering the extracted nodes by using a clustering algorithm, to identify the request nodes and the response nodes that are in the nodes.

Optionally, in another embodiment, the determining, based on a selected optimization objective and from the connection paths, at least one preferred connection path includes: calculating the number of times the original data flow accesses each connection path between the request node of the triangle model and the response node of the triangle model; and determining that a connection path, which is in the first N connection paths of all the connection paths in order of the number of times of being accessed, is the preferred connection path, where N is a positive integer.

Optionally, in another embodiment, the method in FIG. 10 further includes: presenting a first data flow diagram, where the first data flow diagram includes the nodes and the connection relationship between the nodes.

Optionally, in another embodiment, the method in FIG. 10 further includes: presenting a second data flow diagram, where the second data flow diagram includes the request node of the triangle model, the response node of the triangle model, and the connection path.

Optionally, in another embodiment, the optimization objective is determined based on at least one of the following factors: quality of service, connection stability, signal strength, and access frequency.

The foregoing describes in detail the method for establishing a network unit based on a triangle model in an embodiment of the present invention with reference to FIG. 10. The following describes in detail a network unit establishing system in an embodiment of the present invention with reference to FIG. 11 and FIG. 12.

Figure 11:
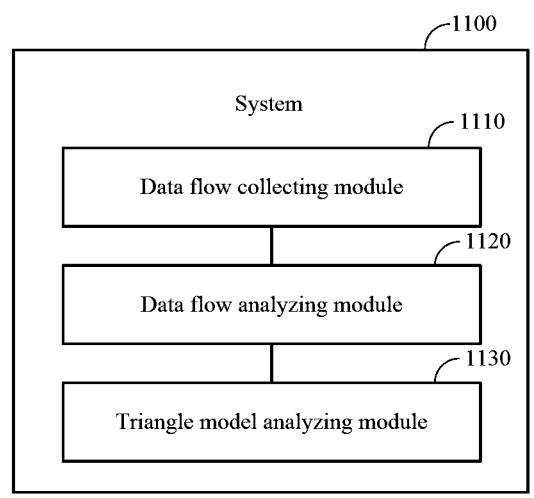
FIG. 11 is a schematic block diagram of a network unit establishing system according to an embodiment of the present invention.

FIG. 11 is a schematic block diagram of a system for establishing a network unit based on a triangle model according to an embodiment of the present invention. A system 1100 in FIG. 11 includes: a data flow collecting module 1110, a data flow analyzing module 1120, and a triangle model analyzing module 1130. It should be understood that the system 1100 can implement the steps in FIG. 10, which, to avoid repetition, are not described herein again.

The data flow collecting module 1110 is configured to obtain an original data flow used to acquire a target service, where the original data flow includes information about nodes passed through for acquiring the target service, and the nodes include: request nodes used to request the target service, response nodes used to provide the target service, and an intermediate node that is on a network and has a data analyzing and processing capability to enable the request nodes to acquire the target service.

The data flow analyzing module 1120 is configured to: according to the original data flow obtained by the data flow collecting module 1110, determine the request nodes and the response nodes that are in the nodes, and determine a connection relationship between the nodes.

The triangle model analyzing module 1130 is configured to combine the request nodes determined by the data flow analyzing module 1120 into a request node of a triangle model and the response nodes determined by the data flow analyzing module 1120 into a response node of the triangle model, and determine a connection path between the first composite node and the second composite node according to the determined connection relationship between the nodes; determine, based on a selected optimization objective and from the connection paths, at least one preferred connection path, and determine that a network node on the at least one preferred connection path is an intermediate node of the triangle model, where the triangle model refers to a triangle connection formed by the response node acting as a service provider, the intermediate node acting as a broker, and the request node acting as a buyer.

Optionally, in an embodiment, the data flow analyzing module 1120 is specifically configured to: according to a semantic meaning of the original data flow, determine the request nodes and the response nodes that are in the nodes, and determine the connection relationship between the nodes.

Optionally, in another embodiment, the data flow analyzing module 1120 is specifically configured to extract, from the original data flow and according to semantic analysis on the original data flow, the information about the nodes, and determine the nodes and the connection relationship between the nodes according to the information; and cluster the extracted nodes by using a clustering algorithm, to identify the request nodes and the response nodes that are in the nodes.

Optionally, in another embodiment, the triangle model analyzing module 1130 is specifically configured to calculate the number of times the original data flow accesses each connection path between the request node of the triangle model and the response node of the triangle model; and determine that a connection path, which is in the first N connection paths of all the connection paths in order of the number of times of being accessed, is the preferred connection path, where N is a positive integer.

Optionally, in another embodiment, the system 1100 may further include: a user-interaction and presenting module, configured to present a first data flow diagram, where the first data flow diagram includes the nodes and the connection relationship between the nodes.

Optionally, in another embodiment, the user-interaction and presenting module is further configured to present a second data flow diagram, where the second data flow diagram includes the request node of the triangle model, the response node of the triangle model, and the connection path.

Optionally, in another embodiment, the system 1100 may further include: a triangle model output module, configured to output the request node, the response node, and the intermediate node that are of the triangle module and determined by the triangle model analyzing module.

Optionally, in another embodiment, the optimization objective is determined based on at least one of the following factors: quality of service, connection stability, signal strength, and access frequency.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An intermediate node determining method, comprising:
    collecting an original data flow used to acquire a target service, wherein the original data flow comprises information about nodes passed through for acquiring the target service, and the nodes comprise: request nodes used to request the target service, response nodes used to provide the target service, and an intermediate node that is on a network and has a data analyzing and processing capability to enable the request nodes to acquire the target service;
    based on the original data flow, determining the request nodes and the response nodes that are in the nodes, and determining a connection relationship between the nodes;
    combining the determined request nodes into a first composite node and the determined response nodes into a second composite node, and determining, based on the determined connection relationship between the nodes, a connection path between the first composite node and the second composite node; and determining, based on a selected optimization objective and from the connection paths, at least one preferred connection path, to acquire an intermediate node on the at least one preferred connection path.

2. The method according to claim 1, wherein:

the based on the original data flow, determining the request nodes and the response nodes that are in the nodes, and determining a connection relationship between the nodes comprises:

based on a semantic meaning of the original data flow, determining the request nodes and the response nodes that are in the nodes, and determining the connection relationship between the nodes.

3. An intermediate node determining method comprising:

collecting an original data flow used to acquire a target service, wherein the original data flow comprises information about nodes passed through for acquiring the target service, and the nodes comprise request nodes for requesting the target service, response nodes for providing the target service, and an intermediate node on a network and has data analyzing and processing capabilities to enable the request nodes to acquire the target service;

determining the request and response nodes based on the information in the original data flow;

determining a connection relationship between the nodes based on a semantic meaning of information in the original data flow, wherein determining the request and response nodes and determining the connection relationship between the nodes comprises extracting from the original data flow and based on a semantic analysis of the original data flow, the information about the determined request and response nodes, and determining the nodes and the connection relationship between the determined request and response nodes according to the information;

clustering the determined request and response nodes by using a clustering algorithm, to identify the request and response nodes that are in the node;

combining the determined request nodes into a first composite node and the determined response nodes into a second composite node;

determining, based on the determined connection relationship between the nodes, a connection path between the first and second composite nodes; and determining, based on a selected optimization objective and from the connection paths, at least one preferred connection path to acquire an intermediate node on the at least one preferred connection path.

4. The method according to claim 3, wherein the determining, based on a selected optimization objective and from the connection paths, at least one preferred connection path comprises:

calculating the number of times the original data flow accesses each connection path between the first composite node and the second composite node; and determining that a connection path, which is in the first N connection paths of all the connection paths in order of the number of times of being accessed, is the preferred connection path, wherein N is a positive integer.

5. The method according to claim 3, further comprising:

presenting a first data flow diagram, wherein the first data flow diagram comprises the nodes and the connection relationship between the nodes.

6. The method according to claim 3, further comprising:

presenting a second data flow diagram, wherein the second data flow diagram comprises the first composite node, the second composite node, and the connection path.

7. The method according to claim 3, wherein the optimization objective is determined based on at least one of the following factors: quality of service, connection stability, signal strength, and access frequency.

8. A network node comprising a memory and a processor, wherein the memory stores a program of instructions to be executed by the processor so as to configure the processor to:

collect an original data flow used to acquire a target service, wherein the original data flow comprises information about nodes passed through for acquiring the target service, and the nodes comprise (a) request nodes used to request the target service, (b) response nodes used to provide the target service, and (c) an intermediate node that is on a network and has a data analyzing and processing capability to enable the request nodes to acquire the target service;

based on the collected original data flow, determine connection relationships between the request and response nodes in the nodes;

combine the request nodes into a first composite node and the response nodes into a second composite node;

determine, based on the determined connection relationships between the request and response nodes, connection paths between the first composite node and the second composite node; and determine, based on a selected optimization objective and from the determined connection paths, at least one preferred connection path, to acquire the intermediate node on the at least one preferred connection path.

9. The network node according to claim 8, wherein, based on a semantic meaning of the original data flow, the processor is further configured to determine the request nodes and the response nodes that are in the nodes, and determine the connection relationship between the request nodes and the response nodes.

10. The network node according to claim 9, wherein the processor is further configured to extract, from the original data flow and based on semantic analysis on the original data flow, the information about the nodes, and determine the nodes and the connection relationship between the nodes according to the information about the nodes; and cluster the determined nodes by using a clustering algorithm, to identify the request nodes and the response nodes that are in the nodes.

11. The network node according to claim 8, wherein the processor is further configured to determine the number of times the original data flow accesses each connection path between the first composite node and the second composite node; and determine that a connection path, which is in the first N connection paths of all the connection paths in order of the number of times of being accessed, is the preferred connection path, wherein N is a positive integer.

12. The network node according to claim 8, wherein the processor is further configured to present a first data flow diagram, wherein the first data flow diagram comprises the nodes and the connection relationship between the nodes.

13. The network node according to claim 8, wherein the processor is further configured to present a second data flow diagram, and the second data flow diagram comprises the first composite node, the second composite node, and the connection path.

14. A data processing method, comprising:
collecting, by an intermediate node and from a network, related information of a request node used to request a target service, and collecting service information of multiple response nodes, wherein the multiple response nodes are all used to provide the target service;
analyzing, by the intermediate node, the related information of the request node and the service information of the multiple response nodes, and determining, from target services provided by the multiple response nodes, a first target service matching the related information; and
establishing, by the intermediate node, a connection between the request node and a first response node corresponding to the first target service, so that the request node acquires the first target service from the first response node according to the connection.

15. The method according to claim 14, wherein the request node, the intermediate node, and the first response node are a request node, an intermediate node, and a response node of a triangle model, respectively, and the triangle model refers to a triangle connection formed by the response node acting as a service provider, the intermediate node acting as a broker, and the request node acting as a buyer.

16. The method according to claim 14, the related information of the request node comprises identity information of the request node or current-state information of the request node.

17. The method according to claim 14, wherein the service information comprises a type of the target service or content of the target service, and the intermediate node determines, by using big data analysis, the first target service matching the related information.

18. A data processing apparatus comprising a memory and a processor, wherein the memory stores a program of executable instructions that when executed by the processor configures the processor to:
collect, from a network, related information of a request node used to request a target service, and collect service information of multiple response nodes, wherein the multiple response nodes are all used to provide the target service;
analyze the related information of the request node and the service information of the multiple response nodes that are collected by the collecting unit, and determine, from target services provided by the multiple response nodes, a first target service matching the related information; and
establish a connection between the request node and a first response node corresponding to the first target service, so that the request node acquires the first target service from the first response node according to the connection.

19. The apparatus according to claim 18, wherein the request node, the intermediate node, and the first response node are a request node, an intermediate node, and a response node of a triangle model, respectively, and the triangle model refers to a triangle connection formed by the response node acting as a service provider, the intermediate node acting as a broker, and the request node acting as a buyer.

20. The apparatus according to claim 18, the related information of the request node comprises identity information of the request node or current-state information of the request node.

21. The apparatus according to claim 18, wherein the service information comprises a type of the target service or content of the target service, and the intermediate node determines, by using big data analysis, the first target service matching the related information.

22. A network unit establishing method, comprising:
obtaining an original data flow used to acquire a target service, wherein the original data flow comprises information about nodes passed through for acquiring the target service, and the nodes comprise: request nodes used to request the target service, response nodes used to provide the target service, and an intermediate node that is on a network and has a data analyzing and processing capability to enable the request nodes to acquire the target service;
according to the original data flow, determining the request nodes and the response nodes that are in the nodes, and determining a connection relationship between the nodes;
combining the determined request nodes into a request node of a triangle model and the determined response nodes into a response node of the triangle model, and determining a connection path between the first composite node and the second composite node according to the determined connection relationship between the nodes, wherein the triangle model refers to a triangle connection formed by the response node acting as a service provider, the intermediate node acting as a broker, and the request node acting as a buyer; and
determining, based on a selected optimization objective and from the connection paths, at least one preferred connection path, and determining that a network node on the at least one preferred connection path is the intermediate node of the triangle model.

23. The method according to claim 22, wherein:
the according to the original data flow, determining the request nodes and the response nodes that are in the nodes, and determining a connection relationship between the nodes comprises:
according to a semantic meaning of the original data flow, determining the request nodes and the response nodes that are in the nodes, and determining the connection relationship between the nodes.

24. A network unit establishing method comprising:
obtaining an original data flow used to acquire a target service, wherein the original data flow comprises information about nodes passed through for acquiring the target service, and the nodes comprise request nodes for requesting the target service, response nodes for providing the target service, and an intermediate node on a network and has a data analyzing and processing capabilities to enable the request nodes to acquire the target service;
according to a semantic meaning of the original data flow, determining the request nodes and the response nodes that are in the nodes based on information in the in the original data flow, and determining a connection relationship between the nodes, including:
extracting the information from the original data flow and according to semantic analysis on the original data flow, and determining the nodes and the connection relationship between the nodes according to the information; and clustering the determined nodes by using a clustering algorithm, to identify the request nodes and the response nodes;

combining the determined request nodes into a request node of a triangle model and the determined response nodes into a response node of the triangle model;

determining a connection path between the request node of a triangle model and the response node of the triangle model according to the determined connection relationship between the nodes, wherein the triangle model refers to a triangle connection formed by the response node acting as a service provider, the intermediate node acting as a broker, and the request node acting as a buyer; and determining, based on a selected optimization objective and from the connection paths, at least one preferred connection path, and determining that a network node on the at least one preferred connection path is an intermediate node of the triangle model.

25. The method according to claim 24, wherein determining, based on a selected optimization objective and from the connection paths, at least one preferred connection path comprises:

calculating the number of times the original data flow accesses each connection path between the request node of the triangle model and the response node of the triangle model; and determining that a connection path, which is in the first N connection paths of all the connection paths in order of the number of times of being accessed, is the preferred connection path, wherein N is a positive integer.

26. The method according to claim 24, further comprising presenting a first data flow diagram, wherein the first data flow diagram comprises the nodes and the connection relationship between the nodes.

27. The method according to claim 24, further comprising presenting a second data flow diagram, wherein the second data flow diagram comprises the request node of the triangle model, the response node of the triangle model, and the connection path.

28. A network unit establishing system, comprising:

a first processor and non-transitory, computer readable memory storing instructions that when executed by the first processor configure the first processor to obtain an original data flow used to acquire a target service, wherein the original data flow comprises information about nodes passed through for acquiring the target service, and the nodes comprise: request nodes used to request the target service, response nodes used to provide the target service, and an intermediate node that is on a network and has a data analyzing and processing capability to enable the request nodes to acquire the target service;

a second processor and non-transitory, computer readable memory storing instructions that when executed by the second processor configure the second processor to: according to the original data flow obtained by the first processor, determine the request nodes and the response nodes that are in the nodes, and determine a connection relationship between the nodes; and a third processor and non-transitory, computer readable memory storing instructions that when executed by the third processor configure the third processor to combine the request nodes determined by the second processor into a request node of a triangle model and the response nodes determined by the second processor into a response node of the triangle model, and determine, according to the determined connection relationship between the nodes, a connection path between the request node of the triangle model and the response node of the triangle model; determine, based on a selected optimization objective and from the connection paths, at least one preferred connection path, and determine that a network node on the at least one preferred connection path is an intermediate node of the triangle model, wherein the triangle model refers to a triangle connection formed by the response node acting as a service provider, the intermediate node acting as a broker, and the request node acting as a buyer.

29. The system according to claim 28, wherein:

the second processor is further configured to: according to a semantic meaning of the original data flow, determine the request nodes and the response nodes that are in the nodes, and determine the connection relationship between the nodes.

30. The system according to claim 29, wherein:

the second processor is further configured to extract, from the original data flow and according to semantic analysis on the original data flow, the information about the nodes, and determine the nodes and the connection relationship between the nodes according to the information; and cluster the extracted nodes by using a clustering algorithm, to identify the request nodes and the response nodes that are in the nodes.

31. The system according to claim 28, wherein:

the third processor is further configured to calculate the number of times the original data flow accesses each connection path between the request node of the triangle model and the response node of the triangle model; and determine that a connection path, which is in the first N connection paths of all the connection paths in order of the number of times of being accessed, is the preferred connection path, wherein N is a positive integer.

* * * * *